United States Patent [19]

Scharmer

[11] Patent Number: 4,960,104
[45] Date of Patent: Oct. 2, 1990

[54] METHOD AND APPARATUS FOR SOLAR HEATING FLUID

[76] Inventor: Mona Scharmer, 2455 Park Hill Dr., Longview, Wash. 98632

[21] Appl. No.: 380,398

[22] Filed: Jul. 17, 1989

[51] Int. Cl.$^5$ .............................................. F24J 2/42
[52] U.S. Cl. .................................... 126/416; 126/442; 126/443; 126/450; 126/452
[58] Field of Search ............... 126/415, 416, 422, 448, 126/442, 443, 450, 438, 441; 52/222

[56] References Cited

U.S. PATENT DOCUMENTS

| | | | |
|---|---|---|---|
| 3,299,881 | 1/1967 | Koch | 126/422 |
| 3,918,430 | 11/1975 | Stout et al. | 126/450 |
| 3,985,117 | 10/1976 | Sallen | 126/422 |
| 4,089,326 | 5/1978 | Andrassy | 126/422 |
| 4,138,993 | 2/1979 | Conley | 126/416 |
| 4,187,832 | 2/1980 | Tregoning | 126/443 |
| 4,280,328 | 7/1981 | Falconer | 126/435 |
| 4,291,680 | 9/1981 | White | 126/433 |
| 4,406,278 | 9/1983 | Demmer | 126/416 |
| 4,421,104 | 12/1983 | Adcock | 126/443 |

FOREIGN PATENT DOCUMENTS

| | | | |
|---|---|---|---|
| 155337 | 12/1981 | Japan | 126/442 |
| 164953 | 9/1983 | Japan | 126/442 |

Primary Examiner—James C. Yeung
Attorney, Agent, or Firm—Marger, Johnson

[57] ABSTRACT

A 4'×8' sheet of ½" plywood is sealed and painted black. A length of black rubber coated hose is mounted on the board with cable staples to form a single layer of coils. Twelve such boards having hoses so mounted thereon are placed side-by-side and groups of four adjacent boards are covered with a medium grade of clear vinyl. The vinyl is exposed to the sun which heats the boards and the hoses. Water from a swimming pool circulates through the hoses, which transfers heat to the water, and returns to the pool.

21 Claims, 2 Drawing Sheets

METHOD AND APPARATUS FOR SOLAR HEATING FLUID

BACKGROUND OF THE INVENTION

1. Field of the Invention

The present invention relates to methods and apparatus for solar heating fluid and more particularly to such methods and apparatus in which fluid is circulated through a hose.

2. Description of the Related Art

It is known in the art to heat water by circulating it through hose contained within a solar panel having a sheet of Plexiglas forming one side thereof. The Plexiglas admits solar rays into the panel thereby heating the hose and the water therein. One such devise is disclosed in U.S. Pat. No. 4,406,278 issued to Demmer for a heat exchange assembly for swimming pools.

The Demmer heat exchange assembly is constructed by wrapping a particle board with a sheet of heat absorbing film. The edges of the panel comprise extruded aluminum which is cut and mitered to form a rectangular frame when the aluminum, edges are attached to the particle board. A sheet of Plexiglas which is cut to match the frame is mounted on and supported by the aluminum frame.

The Demmer device, although effective to heat water requires sizing and cutting of aluminum and Plexiglas. It would be desirable to provide a method and apparatus for solar heating fluid which can be easily constructed without sizing and cutting materials such as aluminum and Plexiglas.

SUMMARY OF THE INVENTION

The present invention comprises a substantially planar board, a hose mounted on the front side of the board in a single layer of hose coils and a sheet of solar-ray penetrating film wrapped over the hose.

The invention also provides a method for heating a fluid in which a length of hose is coiled on the front side of a board to form a single layer of hose coils. Thereafter a sheet of solar-ray penetrating film is wrapped over the hose, the film is exposed to solar rays and water is circulated through the hose.

It is an object of the present invention to provide a method and apparatus for solar heating fluid which is effective to rapidly heat a large quantity of fluid, such as water in a swimming pool.

It is a more specific object of the present invention to provide such a method and apparatus which can be implemented at a low cost and without the need for sizing and cutting rigid materials such as aluminum and Plexiglas.

DETAILED DESCRIPTION OF THE PREFERRED EMBODIMENT

Figure 1:
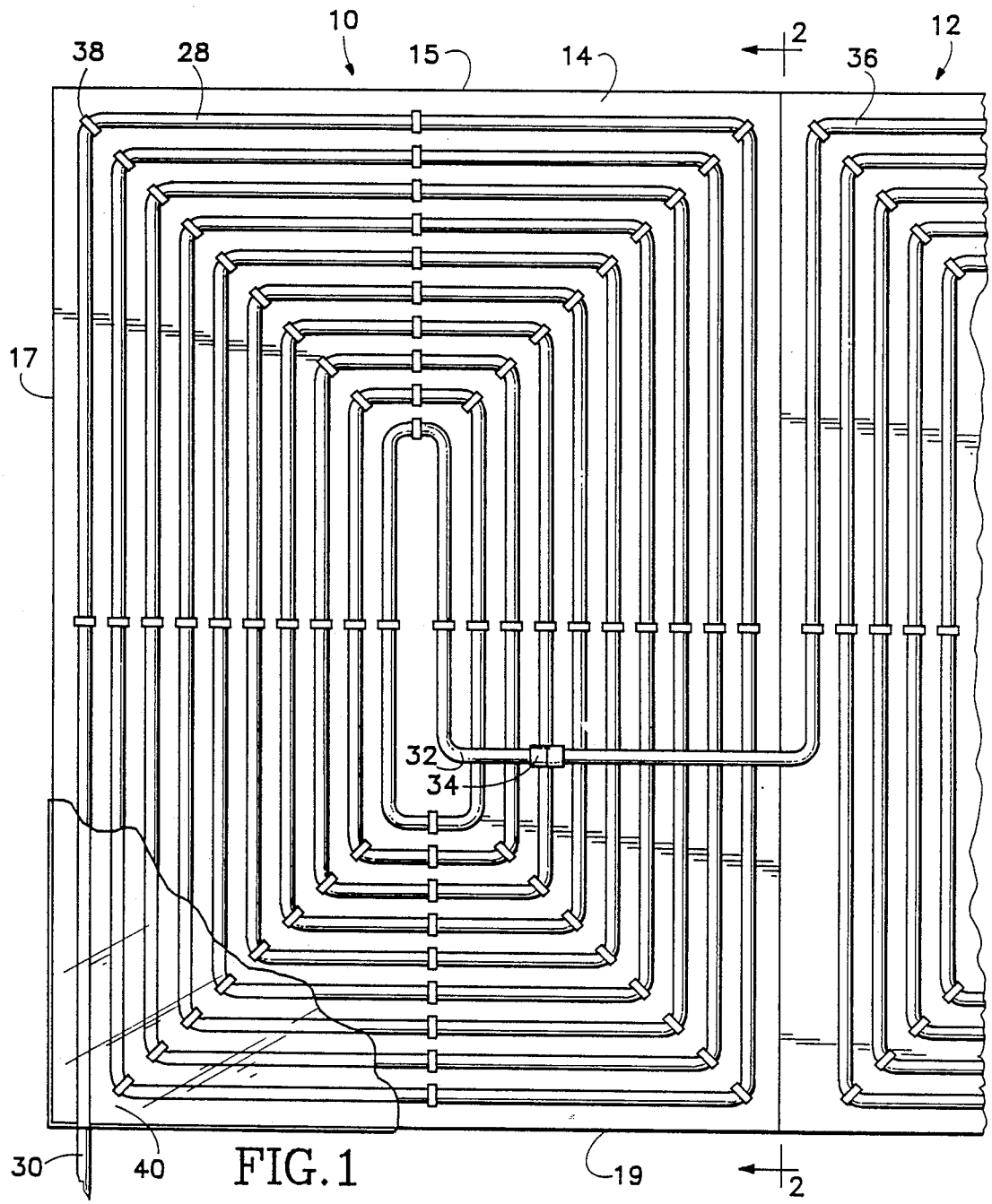
FIG. 1 is a top plan view showing a heating unit constructed in accordance with the present invention and a portion of a second heating unit.
Figure 3:
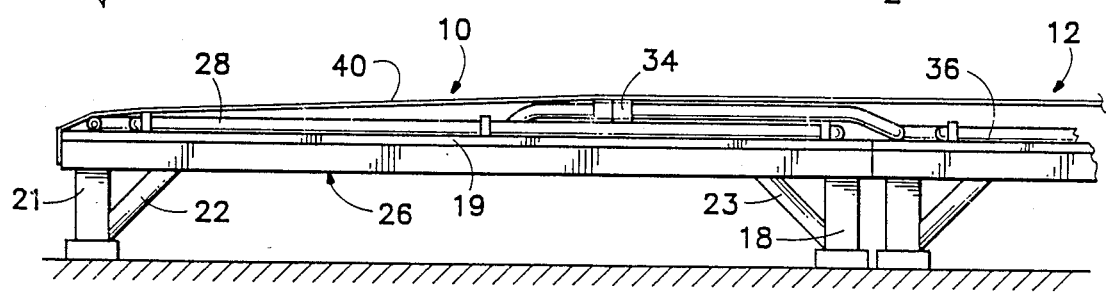
FIG. 3 is a view taken along line 3—3 in FIG. 2.
Figure 2:
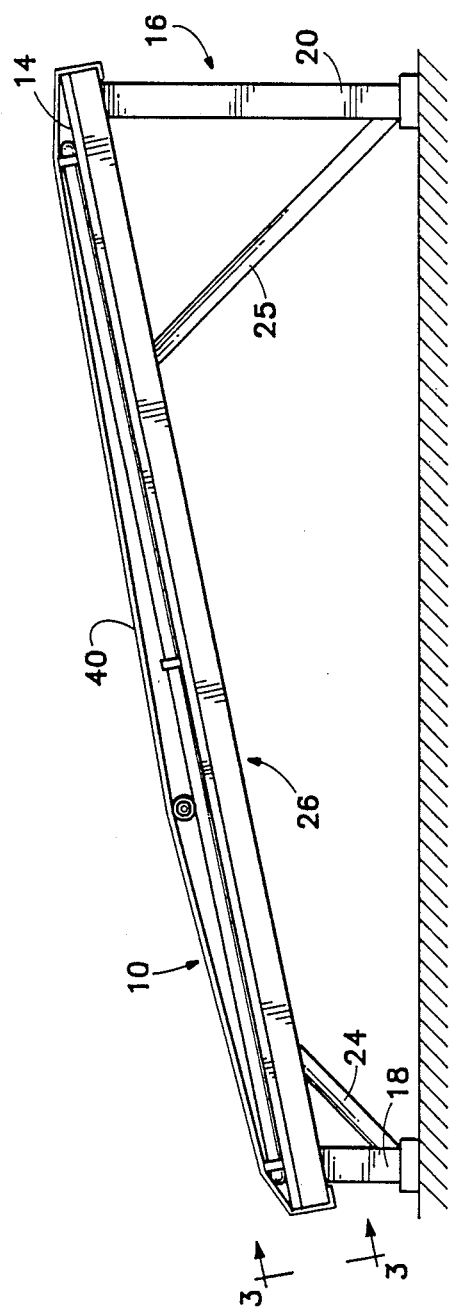
FIG. 2 is a view taken along line 2—2 in FIG. 1.

Turning attention to FIGS. 1-3, indicated generally at 10 is an apparatus or unit for heating fluid constructed in accordance with the present invention. A second unit, a portion of which is indicated generally at 12, is positioned side-by-side with unit 10. Units 10, 12 are substantially identical to one another. Although not shown, units 10, 12 are the first two units in an array of 12 such units, all of which are positioned side-by-side, like units 10, 12, in a single row.

Unit 10 includes a 4'×8' piece of ½" thick plywood board 14. Plywood is commercially available in this size. Board 14 includes an upper edge 15, a side edge 17 and a lower edge 19. The board is mounted on a stand 16 which includes upright wooden support members 18, 20, 21 and wooden brace members 22, 23, 24, 25.

Each of the wooden support members and brace members is connected at its upper end to a rectangular wooden frame 26. In the present embodiment frame 26 is constructed from four 2×4s joined at the corners to form frame 26. Board 14 is nailed to the upper side of frame 26 as shown.

Prior to so mounting board 14 on frame 26 the board is sealed with a commercially available sealer to protect it from the effects of moisture. Thereafter the board is painted black to enhance absorption of solar radiation. The board is then mounted on frame 26 as shown and described.

A ⅜" diameter hose 28 includes a first end 30 having a conventional threaded connector (not shown) mounted thereon. A second end 32 likewise includes a connector 34 which is connected to a hose 36 mounted on unit 12. Hoses 28, 36 are substantially identical to one another and each includes a central core which defines a circular central passageway through which water flows. The core is surrounded by a layer of polyvinyl chloride (P.V.C.) which in turn is surrounded by a layer of rubber that forms the exterior of the hose. The rubber layer is black also to enhance absorption of solar radiation by the hose for heating the rubber and thus the water flowing therethrough. In between the P.V.C. and rubber layer is a layer of tire cord.

A plurality of commercially available cable staples, like staple 38, are used to mount hose 28 on board 14. Each cable staple is U-shaped and includes sharpened points on each end thereof which are driven into board 14 when the top of the staple is hit with a hammer. Staples are periodically spaced along the length of the hose in order to arrange a single layer of coils as shown and to fix the hose against movement.

Each of the other heating units, like units 10, 12, in the twelve-unit row are substantially identical to unit 10.

A sheet of medium grade clear vinyl film 40 is stretched over edges 15, 17, 19 of board 14 and over hoses 28, 36. Sheet 40 is likewise stretched over the upper and lower edges of the board in heating unit 12. In the present embodiment of the invention the vinyl is stretched over the upper and lower edges of four such consecutively positioned heating units, including units 10, 12, and around edge 17 of unit 10, the first heating unit in the series, and the outer edge of the fourth or last heating unit (not shown). When the vinyl is so positioned, it is stapled to frame 26 as shown in FIGS. 2 and 3.

Figure 4:
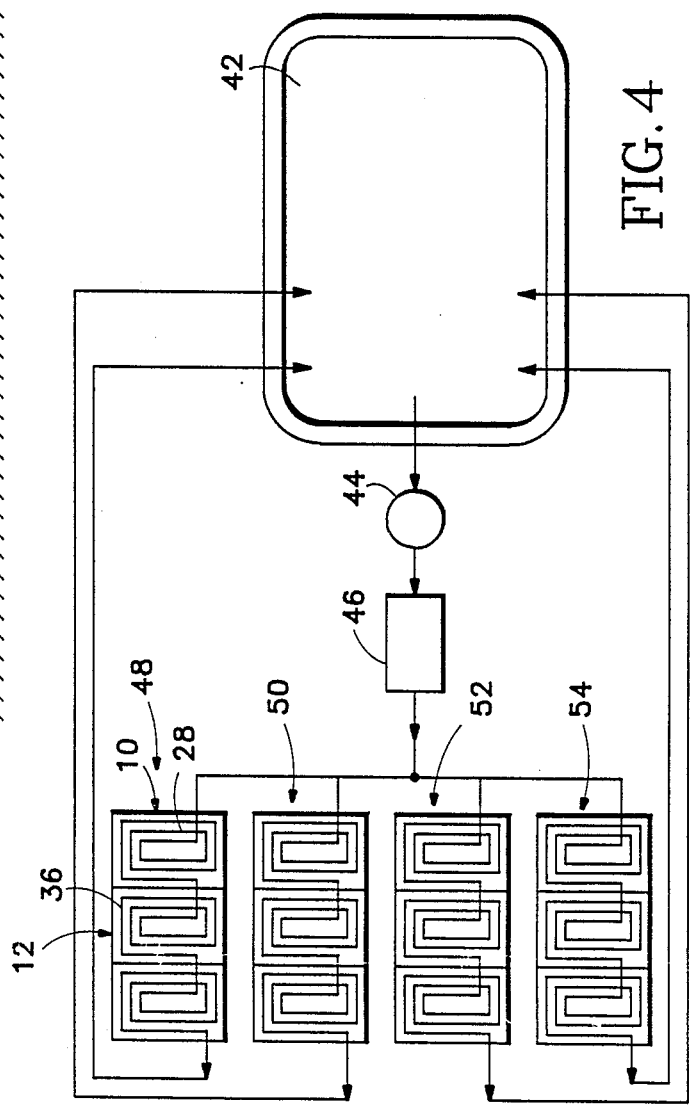
FIG. 4 is a schematic showing a plurality of heating units constructed in accordance with the present invention connected for heating water in a swimming pool.

Turning attention now to FIG. 4, indicated schematically therein is a swimming pool 42. The swimming pool includes a conventional water circulation system which incorporates a pump 44 and a filter 46. In normal operation, the pump 44 draws water from pool 42 and propels it through filter 46 thereby cleaning the water. Water is returned to pool 42 from filter 46.

When utilized with the present invention, the circulation system is disconnected at a point between filter 46 and the return to pool 42. The outlet of filter 46 is then connected to a four-way splitter which communicates water to each of four sets 48, 50, 52, 54 of three heating units. Although illustrated schematically in groups of three, it is to be appreciated that, in the present embodiment of the invention, all twelve of the heating units are arranged side-by-side with each consecutive group of four having a film, like film 40, stretched thereover as described above. Each of the hoses on adjacent heating units within each set of heating units, like hoses 28, 36 in set 48, are connected together via the threaded connectors, like connector 34 is connected to the connector on hose 36. The hose on every third unit, i.e., the last unit in each set, is not connected to the adjacent unit but rather returns warmed water to pool 42.

In operation, pump 44 continuously circulates water from pool 42 through filter 46 and into each of sets 48, 50, 52, 54 of the heating units.

In set 48, water circulates through hose 28 in heating unit 10, through hose 36 in unit 12, through the hose on the third heating unit and back to the pool. Water similarly circulates through each of the other sets. Because each of the boards, like board 14, and the hose, like hose 28, mounted thereon are black, absorption of solar radiation is optimized thereby heating the hose and the board. As can be seen in FIG. 2, sheet 40 is supported somewhat over the hose coils that are fixed to the board via the cable staples by end 32 of hose 28 and the end of hose 36 connected to connector 34. These hose ends lay across the coils formed by hoses 28,36 and thus support sheet 40 to create a plenum, the air in which is heated primarily by the heat from board 14 and hose 28. Film 40 thus insulates hose 28 from the ambiant air which would tend to cool the hose and the water therein.

The present embodiment was used to heat approximately 25,000 gallons of water in a swimming pool to 100° Fahrenheit with the average air temperature being approximately 75°.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for heating a fluid comprising the steps of:
   providing a substantially planar surface;
   coiling a plurality of hoses adjacent one another on said surface so that each hose forms a first layer of substantially planar spiral coils having an inner end and an outer end;
   connecting the inner end of each spiral to the outer end of the next adjacent spiral by placing the inner end over a portion of the first hose layer thereby forming a second layer of hose comprising a single section thereof which extends from the inner end of the spiral to the outer end of the next adjacent spiral;
   wrapping a sheet of solar-ray penetrating film over the hoses by placing the film directly on the hoses so that the second layer of hose supports the film and spaces it away from substantially all of the first layer of hose thereby forming a plenum;
   connecting the outer end of the first hose to a source of fluid;
   exposing the film to solar rays; and
   circulating the fluid through the hoses.

2. The method of claim 1 wherein said method further includes the step of painting the front side of said surface black prior to the step coiling the hoses on the board.

3. The method of claim 1 wherein said method further includes the step of fastening the hoses to the surface.

4. The method of claim 3 wherein the step of fastening the hoses to the surface comprises the step of stapling selected sections of the hose to the surface.

5. The method of claim 1 wherein said planar surface is defined by one side of a board and wherein said method further comprises the step of wrapping the film around the edges of the board and fastening the film to the rear side of the board thereby securing the film over the hoses.

6. Apparatus for heating a fluid comprising:
   means defining a substantially planar surface;
   a first layer of hose comprising a plurality of hoses mounted on said surface adjacent one another, each hose forming a substantially planar spiral having an inner end and an outer end;
   means for connecting the inner end of each spiral to the outer end of the next adjacent spiral;
   a second layer of hose comprising a single section thereof which extends from the inner end of each spiral to the outer end of the next adjacent spiral when said hose ends are so connected;
   a sheet of solar ray penetrating film placed directly on the hoses so that the second layer of hose supports the film and spaces it away from substantially all of the first layer of hose thereby forming a plenum.

7. The apparatus of claim 6 wherein said planar surface is defined by one side of a board and wherein said front side of said board is painted black.

8. The apparatus of claim 7 wherein said front side of said board is sealed prior to being painted.

9. The apparatus of claim 7 wherein said hoses are stapled to the front side of said board.

10. The apparatus of claim 7 wherein said film is wrapped around the edges of said board and fastened to the rear side of said board thereby securing the film over the hoses.

11. The apparatus of claim 6 wherein said hoses are black.

12. The apparatus of claim 11 wherein said hoses include a layer of rubber around a central core.

13. A method for heating water in a swimming pool of the type having a water circulation system including a pump for drawing water from the pool, circulating the water through a filter and returning the water to the pool, said method comprising the steps of:
   creating a plurality of heating units, each of which is constructed by placing a length of hose on the front side of a board;
   wrapping a sheet of solar-ray penetrating film around the upper and lower edges of the heating unit boards and fastening the film to the rear sides of the boards;
   connecting the heating units to one another by connecting one end of the hose on the first heating unit to one end of the hose on the next heating unit and so on;

disconnecting the water circulation system at a point after filtration of the water and prior to return of the filtered water to the pool;

connecting the other end of the hose on the first heating unit to the circulation system for receiving filtered water therefrom;

placing the free end of the hose on the last heating unit in the pool;

exposing the heating units to solar rays; and turning on the pump.

14. The method of claim 13 wherein said method further includes the step of painting the front side of each board black prior to the step of coiling a length of hose on the front side of the board.

15. The method of claim 14 wherein said method further includes the step of sealing the front side of each board prior to the step of painting the front side of each board black.

16. The method of claim 13 wherein said method further includes the step of fastening each hose to its associated board.

17. The method of claim 16 wherein the step of fastening each hose to its associated board comprises the step of stapling selected sections of the hose to the board.

18. The method of claim 13 wherein said method further includes the step of arranging the heating units side-by-side to form a substantially planar array of hose.

19. The method of claim 18 wherein the step of wrapping a sheet of solar-ray penetrating film around the upper and lower edges of the heating unit boards comprises the step of wrapping the film around the upper and lower edges of a plurality of the boards.

20. The method of claim 19 wherein said method further includes the step of wrapping the film around the outer edges of the boards over which the film is wrapped and fastening the film to the rear sides of the boards.

21. The method of claim 13 wherein the step of creating a plurality of heating units, each of which is constructed by placing a length of hose on the front side of a board comprises the step of coiling the hose on the front side of the hose to form a substantially single layer of coils.

* * * * *